United States Patent
Lee et al.

(10) Patent No.: US 8,956,769 B2
(45) Date of Patent: Feb. 17, 2015

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Chem, Ltd., Seoul (KR)

(72) Inventors: Byoung Bae Lee, Daejeon (KR); Jae Seung Oh, Seoul (KR); Yeon Suk Hong, Daejeon (KR); You Jin Shim, Daejeon (KR); Min Ah Kim, Daejeon (KR)

(73) Assignee: LG Chem, Ltd. (KR)

( * ) Notice: Subject to any disclaimer, the term of this patent is extended or adjusted under 35 U.S.C. 154(b) by 191 days.

(21) Appl. No.: 13/755,468

(22) Filed: Jan. 31, 2013

(65) Prior Publication Data

US 2013/0164637 A1    Jun. 27, 2013

Related U.S. Application Data

(63) Continuation of application No. PCT/KR2012/011034, filed on Dec. 17, 2012.

(30) Foreign Application Priority Data

Dec. 27, 2011    (KR) .......................... 10-2011-0143934

(51) Int. Cl.
| | |
|---|---|
| *H01M 6/16* | (2006.01) |
| *H01M 10/0569* | (2010.01) |
| *H01M 10/052* | (2010.01) |
| *H01M 10/0567* | (2010.01) |

(52) U.S. Cl.
CPC ........ *H01M 10/0569* (2013.01); *H01M 10/052* (2013.01); *H01M 10/0567* (2013.01); *Y02E 60/122* (2013.01)

USPC .......................................................... 429/338

(58) Field of Classification Search
CPC ............ H01M 10/052; H01M 10/056; H01M 10/0564; H01M 10/0567; H01M 10/0569; H01M 10/0568; H01M 2300/0025; H01M 2300/0028; H01M 2300/0034; H01M 2300/0037; Y02E 60/122

See application file for complete search history.

(56) References Cited

U.S. PATENT DOCUMENTS

| | | | | |
|---|---|---|---|---|
| 5,587,871 | A * | 12/1996 | Ue et al. ......................... | 361/504 |
| 6,296,973 | B1 * | 10/2001 | Michot et al. .................. | 429/300 |
| 6,797,437 | B2 | 9/2004 | Tsukamoto et al. | |
| 2005/0014070 | A1 * | 1/2005 | Palanisamy et al. .......... | 429/326 |
| 2010/0304222 | A1 | 12/2010 | Park et al. | |

FOREIGN PATENT DOCUMENTS

| | | |
|---|---|---|
| JP | 92-59925 A | 10/1997 |
| JP | 2005-190873 A | 7/2005 |
| JP | 2006-179458 A | 7/2006 |
| KR | 20080087346 A | 10/2008 |
| KR | 20090076314 A | 7/2009 |
| KR | 20090081629 A | 7/2009 |
| KR | 20100082494 A | 7/2010 |

* cited by examiner

*Primary Examiner* — Raymond Alejandro

(74) *Attorney, Agent, or Firm* — Lerner, David, Littenberg, Krumholz & Mentlik, LLP

(57) ABSTRACT

A non-aqueous electrolyte solution includes an electrolyte solution including an amide compound and a lithium salt, and a dinitrile compound substituted by a hetero atom at a main chain, and a lithium secondary battery includes the non-aqueous electrolyte solution. By using the non-aqueous electrolyte solution, a lithium secondary battery having an improved swelling phenomenon and an increased charging/discharging performance may be provided.

11 Claims, 1 Drawing Sheet

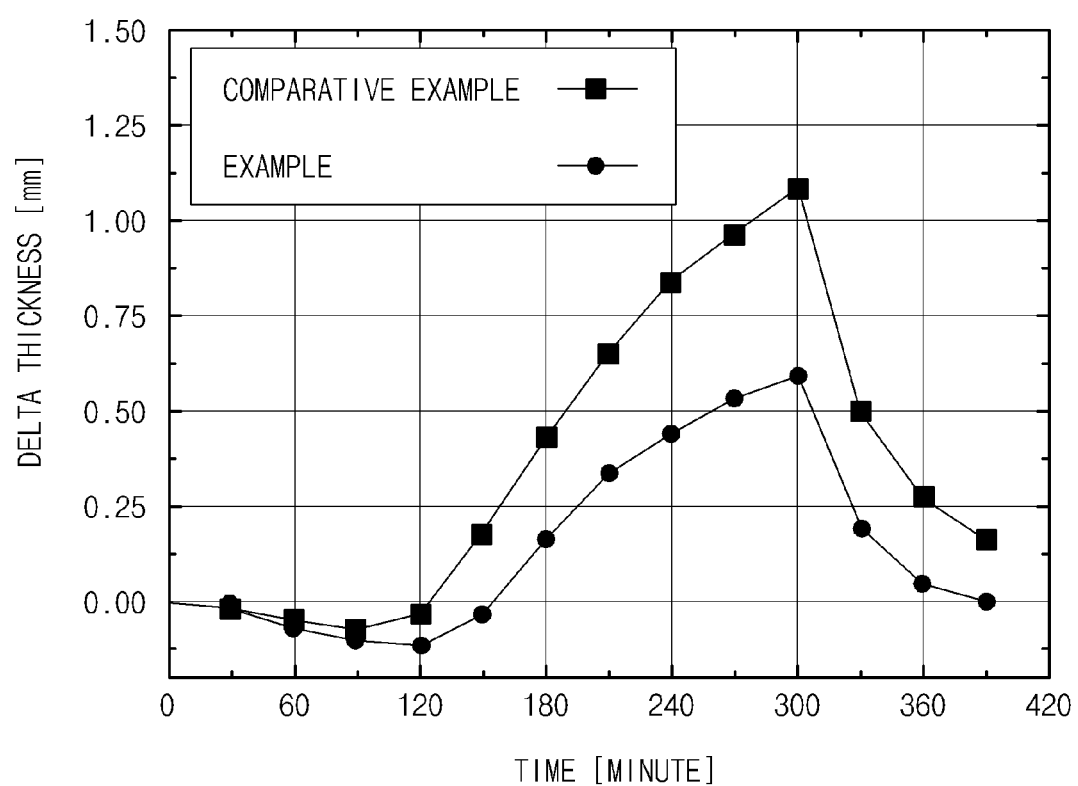

NON-AQUEOUS ELECTROLYTE SOLUTION FOR LITHIUM SECONDARY BATTERY AND LITHIUM SECONDARY BATTERY INCLUDING THE SAME

CROSS REFERENCE TO RELATED APPLICATIONS

This application is a continuation of International Application No. PCT/KR2012/011034 filed on Dec. 17, 2012, which claims priority from Korean Patent Application No. 10-2011-0143934 filed with Korean Intellectual Property Office on Dec. 27, 2011, the entire contents of which are incorporated herein by reference.

BACKGROUND OF THE INVENTION

1. Field of the Invention

The present invention relates to a non-aqueous electrolyte solution for a lithium secondary battery, which includes a dinitrile compound in which a hetero atom is substituted at a main chain to prevent a swelling phenomenon of the battery and a lithium secondary battery including the same.

2. Description of the Related Art

Recently, attention on an energy storing technique is increasing more and more. As the application field of the energy storing technique is enlarged to a cellular phone, a camcorder and a notebook personal computer (PC), and by extension, to an electric vehicle, requirements on a battery having a high energy density, which is used as the power supply of an energy electronic device, are increasing. A lithium secondary battery is the most appropriate battery satisfying the above-described requirements, and researches on the lithium secondary battery are actively conducted nowadays.

Among recently applied secondary batteries, a lithium secondary battery developed in the early 1990s includes an anode formed by using a carbon material etc. for absorbing and releasing lithium ions, a cathode formed by using an oxide including lithium, etc. and a non-aqueous electrolyte solution including an appropriate amount of a lithium salt dissolved in a mixed organic solvent.

The organic solvent widely and presently used in the non-aqueous electrolyte solution includes ethylene carbonate, propylene carbonate, dimethoxyethane, gamma butyrolactone, N,N-dimethylformamide, tetrahydrofuran, acetonitrile, etc. However, the above described solvents may generate a gas due to the oxidation of an electrolyte when stored at a high temperature for a long time. In this case, the structure of the battery may be deformed, or an internal short may be generated because of an internal heating due to an overcharge or an over-discharge to induce the ignition or the explosion of the battery.

Recently, in order to solve the above-described limitations, methods for improving the stability of the battery at a high temperature by (1) using a porous polyolefin-based separator having a high melting point and hardly melting at a high temperature surroundings or (2) mixing a flame-retardant solvent or an additive with an electrolyte, have been attempted.

However, the thickness of the porous polyolefin-based separator is commonly required to be increased to accomplish the high melting property. Accordingly, the loading amounts of the anode and the cathode relatively decrease, and the decrease of the capacity of the battery becomes inevitable. In addition, since the melting point of the polyolefin-based separator formed by using PE, PP is about 150° C., the separator may be molten due to the rapid internal heating caused by the oxidation of the electrolyte during over-charging. In this case, an internal short of the battery may be induced and the ignition and the explosion of the battery may be inevitable.

Recently, various researches on developing an electrolyte having new components including an additive have been conducted to solve the above-described limitations. For example, a nonflammable gas having a boiling point of 25° C. or less may be added, a phosphoric acid ester may be added into a carbonate to confirm the nonflammability of the electrolyte, or 30% or more of a nonflammable solute of a perfluoroalkyl or a perfluoro ester may be added into the electrolyte. However, when the nonflammable gas is injected into the electrolyte, the volume of the battery may increase, and a complicated electric assembling process maybe required to be conducted. In addition, when the phosphoric acid ester is added into the electrolyte, the performance of the battery may be deteriorated due to a high reduction potential. When the perfluoro compound is added into the electrolyte, a lithium salt may be precipitated from the organic solvent electrolyte.

In order to improve the above-described limitations, researches on an electrolyte including an amide compound, which exhibits a wide electrochemical window and a high thermal and chemical stability and solves the limitation on the evaporation, the ignition of the electrolyte due to the use of the common organic solvent, have been accelerated.

PRIOR ART LITERATURE

Patent Literature (Patent Literature 1) Japanese Patent Publication No. 1997-259925

(Patent Literature 2) Japanese Patent Publication No. 2006-179458

(Patent Literature 3) Japanese Patent Publication No. 2005-190873

(Patent Literature 4) U.S. Pat. No. 6,797,437

SUMMARY OF THE INVENTION

An aspect of the present invention provides a non-aqueous electrolyte solution for a lithium secondary battery, including an additive for suppressing the swelling phenomenon of the battery due to a gas generated during storing at a high temperature and a lithium secondary battery including the same.

Hereinafter, the present invention will be described in detail. The terms and words used in the present specification and claims should not be interpreted by only common or dictionary definition, but should be interpreted as a meaning and concept coincide with the technical spirit of the present invention basing upon the principles that an inventor may appropriately define the concept of a term to explain his invention by the best way.

According to an aspect of the present invention, there is provided a non-aqueous electrolyte solution for a lithium secondary battery. The non-aqueous electrolyte solution includes an ionizable lithium salt, an amide compound represented by the following Chemical Formula 1, a dinitrile compound including a hetero atom as a substituent in a main chain and an organic solvent.

[Chemical Formula 1]

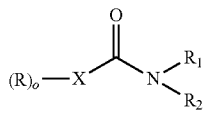

In Chemical Formula 1, R represents one selected from the group consisting of a halogen substituted alkyl group having 1 to 20 carbon atoms, a halogen substituted alkylamine group having 1 to 20 carbon atoms, a halogen substituted alkenyl group having 2 to 20 carbon atoms and a halogen substituted aryl group having 6 to 12 carbon atoms.

$R_1$ and $R_2$ independently represent one selected from the group consisting of a hydrogen atom, a halogen atom, an alkyl group having 1 to 20 carbon atoms, an alkylamine group having 1 to 20 carbon atoms, an alkenyl group having 2 to 20 carbon atoms and an aryl group having 6 to 12 carbon atoms. At least one of $R_1$ and $R_2$ is an alkoxy group represented by —O(CH$_2$)$_p$CH$_3$, and p is an integer of 0 to 8.

X represents one selected from the group consisting of carbon, silicon, oxygen, nitrogen, phosphor and sulfur, in which i) o represents 1 when X is the oxygen or the sulfur, ii) o represents 2 when X is the nitrogen or the phosphor, and iii) o represents 3 when X is the carbon or the silicon.

Particularly, commonly used salts in an electrolyte for a lithium secondary battery may be used without limitation as the ionizable lithium salt for the non-aqueous electrolyte solution and an anion of the ionizable lithium salt may include at least one selected from the group consisting of $F^-$, $Cl^-$, $Br^-$, $I^-$, $NO_3^-$, $N(CN)_2^-$, $BF_4^-$, $ClO_4^-$, $PF_6^-$, $(CH_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FO_2)_2N^-$, $CF_3CF_2(CF_3)_2CO^-$, $(CF_3SO_2)_2CH^-$, $(SF_6)_3C^-$, $(CF_3SO_2)_3C^-$, $CF_3(CF_2)_7SO_3^-$, $CH_3CO_2$, SCN and $(CF_3CF_2SO_2)_2N^-$.

In addition, the amide compound of Chemical Formula 1 included in the electrolyte in accordance with exemplary embodiments may include N-methoxy-N-methyl 2,2,2-trifluoroethyl carbamate, N-methoxy-N-methyl 2-fluoroethyl carbamate, N-methoxy-N-methyl pentafluoropropyl carbamate, N-methoxy-N-methyl 2-perfluorohexyl carbamate, N-methoxy-N-methyl 6-perfluorobutylhexyl carbamate, etc.

In this case, a relative molar ratio of the amide compound to the lithium salt may be in a range of 1-8:1, and more particularly, in a range of 2-6:1.

In the electrolyte solution in accordance with exemplary embodiments, the dinitrile compound including the hetero atom substituent at the main chain may be represented by the following Chemical Formula 2.

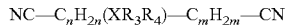   [Chemical Formula 2]

In Chemical Formula 2, X represents oxygen, nitrogen or sulfur, and when X is the oxygen or the sulfur, $R_4$ is not present. $R_3$ and $R_4$ represent an alkyl group having 1 to 12 carbon atoms or a halogen substituted alkyl group having 1 to 12 carbon atoms, and n and m represent an integer of 1 to 6.

In exemplary embodiments, the dinitrile compound of Chemical Formula 2 may be one or a mixture of two or more among 3-methoxy glutaronitrile, 3-ethoxy glutaronitrile, 3-dimethylamino glutaronitrile, thiomethoxy succinonitrile, and 2,2,2-trifluoroethoxy glutaronitrile and may not be limited to these compounds.

In exemplary embodiments, an amount of the dinitrile compound is 0.1 wt % to 10 wt %, particularly, 0.1 wt % to 9 wt %, and more particularly, 0.1 wt % to 7 wt % based on a total amount of the non-aqueous electrolyte solution. When the amount of the dinitrile compound is less than 0.1 wt %, the preventing effect of the battery swelling due to the addition of the dinitrile compound may not be sufficiently obtained, and when the amount of the dinitrile compound exceeds 10 wt %, a lifetime at a high temperature during processing a charging/discharging cycle at a high temperature may be largely deteriorated.

When the dinitrile compound including the hetero atom substituent at the main chain is included in the electrolyte in accordance with exemplary embodiments, the hetero atom may capture a metal ion to reduce the reaction between a dissociated metal ion and the electrolyte. Accordingly, a better preventing effect on the battery swelling may be obtained when comparing with the electrolyte including common dinitrile compounds.

In exemplary embodiments, commonly included organic solvents in an electrolyte for a lithium secondary battery may be used without limitation as the organic solvents for the non-aqueous electrolyte solution. Typically, the organic solvent may be at least one selected from the group consisting of propylene carbonate (PC), ethylene carbonate (EC), diethyl carbonate (DEC), dimethyl carbonate (DMC), ethyl methyl carbonate (EMC), methylpropylene carbonate, dipropyl carbonate (DPC), dimethyl sulfoxide, acetonitrile, dimethoxyethane, diethoxyethane, vinylene carbonate, sulfolane, γ-butyrolactone, propylene sulfite and tetrahydrofuran. Particularly, the ethylene carbonate and the propylene carbonate, which are cyclic carbonates, among the organic solvents are preferably used because the solvents have a high viscosity and a high dielectric constant, and dissociate the lithium salt in the electrolyte easily. More preferably, an appropriate amount of a linear carbonate having a low viscosity and a low dielectric constant such as the dimethyl carbonate and the diethyl carbonate may be mixed with the cyclic carbonate solvent, to obtain an electrolyte solution having a high electric conductivity. The amount of the organic solvent may be 10 wt % to 90 wt % based on the total amount of the electrolyte solution.

The electrolyte in accordance with example embodiments may be usefully applied for manufacturing an electrochemical device such as a lithium secondary battery. Particularly, a lithium secondary battery manufactured by injecting the non-aqueous electrolyte solution for the lithium secondary battery in accordance with exemplary embodiments into an electrode structure including a cathode, an anode and a separator disposed between the cathode and the anode, may be provided. In this case, the cathode, the anode and the separator constituting the electrode structure may be commonly used elements for the manufacture of the lithium secondary battery.

As an active material of the cathode, a transition metal oxide including lithium may be preferably used, for example, one or a mixture of two or more selected from the group consisting of LiCoO$_2$, LiNiO$_2$, LiMnO$_2$, LiMn$_2$O$_4$, Li(Ni$_a$Co$_b$Mn$_c$)O$_2$ (0<a<1, 0<b<1, 0<c<1, a+b+c=1), LiNi$_{1-y}$Co$_y$O$_2$, LiCo$_{1-y}$Mn$_y$O$_2$, LiNi$_{1-y}$Mn$_y$O$_2$ (O=y=1), Li(Ni$_a$Mn$_b$Co$_c$)O$_4$ (0<a<2, 0<b<2, 0<c<2, a+b+c=2), LiMn$_{2-z}$Ni$_z$O$_4$, LiMn$_{2-z}$Co$_z$O$_4$ (O<z<2), LiCoPO$_4$ and LiFePO$_4$. In addition, a sulfide, a selenide, a halide, etc. may be used besides the oxide.

As an active material of the anode, a commonly used material possibly absorb and release lithium ions such as a carbon material, a lithium metal, silicon, tin, etc. may be used. A metal oxide having a potential with respect to lithium of 2V or less, such as TiO$_2$ and SnO$_2$ may be used. Preferably, the carbon material may be used and the carbon material may include both a low crystalline carbon and a high crystalline carbon. The low crystalline carbon typically includes soft carbon and hard carbon, and the high crystalline carbon typically includes a high temperature baked carbon such as natural graphite, kish graphite, pyrolytic carbon, mesophase pitch based carbon fiber, meso-carbon microbeads, mesophase pitches, petroleum or coal tar pitch derived cokes, etc. In this case, the anode may include a binder. The binder may include various binder polymers such as vinylidene fluoride-hexafluoropropylene copolymer (PVDF-co-HFP), polyvinylidene fluoride, polyacrylonitrile, polymethyl methacrylate, etc.

As the separator, commonly used porous polymer film of the common separator may be used. The porous polymer film may be formed by using a polyolefin-based polymer such as an ethylene homopolymer, a propylene homopolymer, an ethylene/butene copolymer, an ethylene/hexene copolymer, an ethylene/hexane copolymer, an ethylene/methacrylate copolymer, etc. The porous polymer film may be used alone or by integrating two or more films. The separator may be a common porous nonwoven fabric such as a glass fiber having a high melting point, and a nonwoven fabric of polyethylene terephthalate fiber, etc. However, the separator is not limited to the above described kinds.

The shape of the lithium secondary battery may not be specifically limited and may be a cylindrical shape using a can, a square shape, a pouch shape, a coin shape, etc.

The non-aqueous electrolyte solution may suppress the generation of a gas while storing a battery at a high temperature, may prevent a swelling phenomenon. As a result, the present invention may provide a battery having a good charging/discharging performance.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a graph illustrating the thickness changes of batteries after full-charging the batteries to 4.2V in accordance with Example 3 and Comparative Example 2 and then, storing in an oven at 90° C.

DETAILED DESCRIPTION OF THE PREFERRED EMBODIMENT

Exemplary embodiments of the present invention will now be described in detail with reference to the accompanying drawings. However, the exemplary embodiments of the present invention may be modified to various other forms and the scope of the present invention should not be interpreted to the following exemplary embodiments. The exemplary embodiments of the present invention are provided in order to fully explain the present invention for a person having an average knowledge in the art.

EXAMPLES

I. Method for Preparing Electrolyte

Example 1

(First step) Synthesis of a dinitrile compound including a hetero atom substituent in a main chain Into a tetrahydrofuran solution, 0.7 g of sodium hydride was added. After cooling to 0° C., 3 g of 3-hydroxyglutaronitrile dissolved in a tetrahydrofuran solvent was slowly dropped. After completing the dropping, dimethyl sulfate was slowly added dropwise and stirred at 0° C. for 15 minutes. After stirring at room temperature for 6 hours, the reactant was extracted using water and dichloromethane and distilled under a reduced pressure to obtain 3-methoxy glutaronitrile (yield 82%).

(Second Step) Synthesis of an Amide Compound Represented by Chemical Formula 1

1.44 g of methoxymethylamine hydrochloride and 1.75 g of triphosgene were mixed with a methylene chloride solution and cooled to 0° C. 3.13 g of triethylamine was slowly added dropwise. After completing the dropping, the temperature was increased to room temperature and stirring was continued for 1 hour. After completing the reaction, methylene chloride was removed by filtration. Tetrahydrofuran was added to thus obtained product, and thus produced salt was filtered. The filtrate was distilled under a reduced (vacuum) pressure to obtain 2 g of N-methoxy-N-methyl chloroformate.

Then, 0.78 g of sodium hydride was added to a tetrahydrofuran solution, and 1.7 g of a 2,2,2-trifluoroethanol solution was slowly added dropwise at a low temperature. After completing the dropping, stirring was continued for 2 hours and 2 g of N-methoxy-N-methyl chloroformate obtained at the previous step was slowly added dropwise at a low temperature. After completing the reaction, a small amount of water was added, and the tetrahydrofuran solution was evaporated. Then, an extraction process was conducted using methylene chloride and water. After the extraction, a distillation process was conducted under a reduced (vacuum) pressure to obtain N-methoxy-N-methyl 2,2,2-trifluoroethyl carbamate (yield 72%).

(Third Step) Preparing an Electrolyte Solution 5.8 g of N-methoxy-N-methyl 2,2,2-trifluoroethyl carbamate obtained at the second step and 2 g of $LiPF_6$ were added into a round-bottomed flask and stirred slowly for 2 hours under a nitrogen gas atmosphere to produce 7.8 g of a solution (A). A solution (B) obtained by mixing ethylene carbonate and ethylmethyl carbonate by a volume ratio of 2:1, and the solution (A) were mixed by a weight ratio of 3:7. 5 wt % of 3-methoxy glutaronitrile obtained at the first step based on the total mixture solution was added to the mixture to prepare an electrolyte solution.

Example 2

(Second Step) Synthesis of an Amide Compound Represented by Chemical Formula 1

0.35 g of sodium hydride was added into a tetrahydrofuran solution and then, 0.5 g of a 2-fluoroethanol solution was slowly added dropwise at a low temperature. After completing the dropping, stirring was continued for 2 hours. Then, 0.9 g of N-methoxy-N-methyl chloroformate obtained at the second step in Example 1 was slowly added dropwise. After completing the reaction, a small amount of water was added. The tetrahydrofuran solution was distilled and an extraction process was conducted using methylene chloride and water. After completing the extraction, distillation under a reduced (vacuum) pressure was conducted to obtain N-methoxy-N-methyl 2-fluoroethyl carbamate.

(Third step) Preparing an Electrolyte Solution 5.2 g of N-methoxy-N-methyl 2-fluoroethyl carbamate obtained at the (second step) and 2 g of $LiPF_6$ were added into a round-bottomed flask and stirred slowly for 2 hours under a nitrogen gas atmosphere to produce 7.2 g of a solution (A). A solution (B) obtained by mixing ethylene carbonate and ethylmethyl carbonate by a volume ratio of 2:1, and the solution (A) were mixed by a weight ratio of 3:7. 5 wt % of 3-methoxy glutaronitrile obtained at the first step of Example 1 based on the total mixture solution was added to the mixture to prepare an electrolyte solution.

Comparative Example 1

An electrolyte solution was prepared through conducting the same procedure described in Example 1 except for adding 3 wt % of vinylene carbonate and 2 wt % of fluoroethylene as additives instead of 3-methoxy glutaronitrile at the (third step) in Example 1.

II. Manufacture of Secondary Battery

Example 3

(Manufacture of a Cathode)

$LiCoO_2$ as a cathode active material, synthetic graphite as a conductive material, and polyvinylidene fluoride as a binder were mixed by a weight ratio of 94:3:3. Then, N-methyl pyrrolidone was added to prepare a slurry. The slurry was coated on an aluminum foil and dried at 130° C. for 2 hours to manufacture a cathode.

(Manufacture of an Anode)

Synthetic graphite as an anode active material, a conductive material, and a binder were mixed by a weight ratio of 94:3:3. Then, N-methyl pyrrolidone was added to prepare a slurry. The slurry was coated on a copper foil and dried at 130° C. for 2 hours to manufacture an anode.

(Assembling of a Secondary Battery)

The cathode and the anode manufactured as described above were cut by 1 $cm^2$, and a separator was interposed between the cathode and the anode. The electrolyte solution prepared in Example 1 was injected to manufacture a lithium secondary battery.

Example 4

A secondary battery was manufactured through conducting the same procedure described in Example 3 except for using the electrolyte solution of Example 2 instead of the electrolyte solution of Example 1.

Comparative Example 2

A secondary battery was manufactured through conducting the same procedure described in Example 3 except for using the electrolyte solution of Comparative Example 1 instead of the electrolyte solution of Example 1.

III. Evaluation on Physical Properties

In order to evaluate the stability of the batteries manufactured in Examples 3 and 4 and Comparative Example 2, the physical properties of the electrolytes were evaluated according to the following methods.

Experiment 1: Test on Safety

Each of the batteries manufactured by Examples 3 and 4 and Comparative Example 2 was full-charged to 4.2V and stored at 90° C. for 4 hours. The initial thickness and the thickness change after the storing were measured, and the result is illustrated in the following Table 1. The thickness change (Δt) was illustrated as a relative value when the thickness increase of the battery of Comparative Example 2 was set to 100%.

TABLE 1

|  | Δt (%) |
| --- | --- |
| Example 3 | 61 |
| Example 4 | 65 |
| Comparative Example 2 | 100 |

As illustrated in Table 1, the thickness increase (the swelling phenomenon) of the batteries in accordance with the present invention (Examples 3 and 4) after storing for a long time at the high temperature was found to be largely suppressed when comparing with that of the battery of Comparative Example 2. When about 5 wt % of 3-methoxy glutaronitrile was added based on the total amount of the electrolyte, the swelling at a high temperature was confirmed to improve by about 30% or more (see FIG. 1).

Experiment 2: Evaluation on Charging/Discharging Performance

Each of the batteries according to Examples 3 and 4 and Comparative Example 2 was charged at 25° C. at a constant current of 0.5 C=400 mA. After the voltage of the battery becomes 4.2V, an initial charging was performed until a charging current value became 50 mA at a constant voltage value of 4.2V. The initially charged battery was discharged until the battery voltage became 3V at the constant current of 0.2 C, and the discharge capacity at this time was set to an initial capacity. The initial capacity values of battery obtained for each battery are illustrated in Table 2.

TABLE 2

|  | Initial capacity |
| --- | --- |
| Example 3 | 1045 |
| Example 4 | 1043 |
| Comparative Example 2 | 1039 |

As illustrated in Table 2, the initial capacity of battery for the batteries of Examples 3 and 4 was found to be increased when comparing with that for the battery of Comparative Example 2.

What is claimed is:

1. A non-aqueous electrolyte solution for a lithium secondary battery comprising:
an ionizable lithium salt;
an amide compound represented by the following Chemical Formula 1;
a dinitrile compound including a hetero atom as a substituent in a main chain; and
an organic solvent,

[Chemical Formula 1]

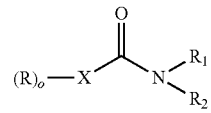

in Chemical Formula 1,
R represents one selected from the group consisting of a halogen substituted alkyl group having 1 to 20 carbon atoms, a halogen substituted alkylamine group having 1 to 20 carbon atoms, a halogen substituted alkenyl group having 2 to 20 carbon atoms and a halogen substituted aryl group having 6 to 12 carbon atoms,
$R_1$ and $R_2$ independently represent one selected from the group consisting of a hydrogen atom, a halogen atom, an alkyl group having 1 to 20 carbon atoms, an alkylamine group having 1 to 20 carbon atoms, an alkenyl group having 2 to 20 carbon atoms and an aryl group having 6 to 12 carbon atoms, at least one of $R_1$ and $R_2$ being an alkoxy group represented by —$O(CH_2)_pCH_3$, and p being an integer of 0 to 8, and X represents one selected from the group consisting of carbon, silicon, oxygen, nitrogen, phosphor and sulfur, in which i) o represents 1 when X is the oxygen or the sulfur, ii) o represents 2 when X is the nitrogen or the phosphor, and iii) o represents 3 when X is the carbon or the silicon.

2. The non-aqueous electrolyte solution for a lithium secondary battery of claim 1, wherein an anion of the lithium salt is at least one selected from the group consisting of $F^-$, $Cl^-$, $Br^-$, $I^-$, $NO_3^-$, $N(CN)_2^-$, $BF_4^-$, $ClO_4^-$, $PF_6^-$, $(CH_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FO_2)_2N^-$, $CF_3CF_2(CF_3)_2CO^-$, $(CF_3SO_2)_2CH^-$, $(SF_6)_3C^-$, $(CF_3SO_2)_3C^-$, $CF_3(CF_2)_7SO_3^-$, $CH_3CO_2^-$, $SCN^-$ and $(CF_3CF_2SO_2)_2N^-$.

3. The non-aqueous electrolyte solution for a lithium secondary battery of claim 1, wherein the amide compound is at least one selected from the group consisting of N-methoxy-N-methyl 2,2,2-trifluoroethyl carbamate, N-methoxy-N-methyl 2-fluoroethyl carbamate, N-methoxy-N-methyl pentafluoropropyl carbamate, N-methoxy-N-methyl 2-perfluorohexyl carbamate and N-methoxy-N-methyl 6-perfluorobutylhexyl carbamate.

4. The non-aqueous electrolyte solution for a lithium secondary battery of claim 1, wherein a relative molar ratio of the amide compound to the lithium salt is in a range of 1-8:1.

5. The non-aqueous electrolyte solution for a lithium secondary battery of claim 1, wherein the dinitrile compound is represented by the following Chemical Formula 2, $$NC-C_nH_{2n}(XR_3R_4)-C_mH_{2m}-CN \quad \text{[Chemical Formula 2]}$$

in Chemical Formula 2,

X represents oxygen, nitrogen or sulfur, when X is the oxygen or the sulfur, $R_4$ is not present, $R_3$ and $R_4$ represent an alkyl group having 1 to 12 carbon atoms or a halogen substituted alkyl group having 1 to 12 carbon atoms, and n and m represent an integer of 1 to 6.

6. The non-aqueous electrolyte solution for a lithium secondary battery of claim 5, wherein the dinitrile compound is one or a mixture of two or more among 3-methoxy glutaronitrile, 3-ethoxy glutaronitrile, 3-dimethylamino glutaronitrile, thiomethoxy succinonitrile, and 2,2,2-trifluoroethoxy glutaronitrile.

7. The non-aqueous electrolyte solution for a lithium secondary battery of claim 1, wherein an amount of the dinitrile compound is 0.1 wt % to 10 wt % based on a total amount of the non-aqueous electrolyte solution.

8. The non-aqueous electrolyte solution for a lithium secondary battery of claim 7, wherein the amount of the dinitrile compound is 0.1 wt % to 9 wt % based on the total amount of the non-aqueous electrolyte solution.

9. The non-aqueous electrolyte solution for a lithium secondary battery of claim 7, wherein the amount of the dinitrile compound is 0.1 wt % to 7 wt % based on the total amount of the non-aqueous electrolyte solution.

10. The non-aqueous electrolyte solution for a lithium secondary battery of claim 1, wherein the organic solvent is at least one selected from the group consisting of propylene carbonate, ethylene carbonate, diethyl carbonate, dimethyl carbonate, ethyl methyl carbonate, methylpropylene carbonate, dipropyl carbonate, dimethyl sulfoxide, acetonitrile, dimethoxyethane, diethoxyethane, vinylene carbonate, sulfolane, γ-butyrolactone, propylene sulfite and tetrahydrofuran.

11. A lithium secondary battery comprising a cathode, an anode, a separator disposed between the cathode and the anode and a non-aqueous electrolyte solution, the non-aqueous electrolyte solution being the non-aqueous electrolyte solution according to claim 1.

* * * * *